United States Patent
McDaniel et al.

(10) Patent No.: US 6,750,302 B1
(45) Date of Patent: Jun. 15, 2004

(54) ORGANOMETAL CATALYST COMPOSITIONS

(75) Inventors: Max P. McDaniel, Bartlesville, OK (US); Kathy S. Collins, Bartlesville, OK (US); Elizabeth A. Benham, Bartlesville, OK (US); Anthony P. Eaton, Dewey, OK (US); Michael D. Jensen, Bartlesville, OK (US); Joel L. Martin, Bartlesville, OK (US); Gil R. Hawley, Dewey, OK (US); Eric T. Hsieh, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/464,953

(22) Filed: Dec. 16, 1999

(51) Int. Cl.$^7$ .............................. C08F 4/02; C08F 4/642; C08F 4/69
(52) U.S. Cl. ..................... 526/64; 526/114; 526/129; 526/137; 526/160; 526/169; 526/943; 526/97; 526/105; 526/106; 526/119; 502/104; 502/107; 502/113; 502/117; 502/119; 502/154; 502/103; 502/120; 502/118; 502/132
(58) Field of Search ................................. 526/114, 129, 526/137, 160, 169, 943, 64, 97, 105, 106; 502/104, 107, 113, 117, 119, 154, 103, 120, 118, 132

(56) References Cited

U.S. PATENT DOCUMENTS

| | | | |
|---|---|---|---|
| 4,077,904 A | 3/1978 | Noshay et al. | |
| 4,101,445 A | 7/1978 | Levine et al. | |
| 4,279,780 A | 7/1981 | Dombro | |
| 4,476,243 A | 10/1984 | Dombro | |
| 4,526,942 A | 7/1985 | Chester et al. | |
| 4,657,998 A | 4/1987 | Malpass | |
| 4,659,685 A | 4/1987 | Coleman, III et al. | |
| 4,788,171 A | 11/1988 | Klendworth | |
| 4,803,253 A | 2/1989 | McDaniel et al. | |
| 4,969,522 A | 11/1990 | Whitehurst et al. | |
| 5,001,204 A | 3/1991 | Klendworth et al. | |
| 5,171,798 A | 12/1992 | McDaniel et al. | |
| 5,183,868 A | 2/1993 | Nordquest | |
| 5,321,105 A | 6/1994 | Rekers et al. | |
| 5,332,707 A | 7/1994 | Karayannis et al. | |
| 5,401,820 A * | 3/1995 | McDaniel et al. ........ | 526/348.5 |
| 5,434,116 A | 7/1995 | Sone et al. ................. | 502/103 |
| 5,439,995 A | 8/1995 | Bailly et al. | |
| 5,444,134 A | 8/1995 | Matsumoto | |
| 5,461,127 A | 10/1995 | Naganuma et al. | |
| 5,468,702 A | 11/1995 | Jejelowo | |
| 5,496,782 A | 3/1996 | Zandona | |
| 5,527,867 A | 6/1996 | Bergmeister ............... | 526/119 |
| 5,543,376 A | 8/1996 | Bergmeister | |
| 5,556,893 A | 9/1996 | Costa et al. | |
| 5,612,271 A | 3/1997 | Zandona | |
| 5,643,847 A | 7/1997 | Walzer, Jr. | |
| 5,648,439 A | 7/1997 | Bergmeister et al. ......... | 526/96 |
| 5,670,580 A | 9/1997 | Tazaki et al. | |
| 5,703,181 A | 12/1997 | Tashiro et al. | |
| 5,705,578 A | 1/1998 | Peifer et al. | |
| 6,013,595 A * | 1/2000 | Lhost et al. ................ | 502/113 |
| 6,107,230 A * | 8/2000 | McDaniel et al. .......... | 502/104 |
| 6,165,929 A | 12/2000 | McDaniel et al. | |
| 6,239,059 B1 | 5/2001 | Saudemont et al. | |
| 6,300,271 B1 | 10/2001 | McDaniel et al. | |

FOREIGN PATENT DOCUMENTS

| | | |
|---|---|---|
| EP | 0 628 574 | 12/1944 |
| EP | 0 416 928 | 3/1991 |
| EP | 733 650 A1 * | 9/1996 |

OTHER PUBLICATIONS

U.S. application No. 09/080,619, McDaniel et al., filed Oct. 9, 2001.

U.S. application No. 09/401,354, McDaniel et al., filed Mar. 12, 2002.

Natta, G., et al., "A Crystallizable Organometallic Complex Containing Titanium and Aluminum", Journal of the American Chemical Society, vol. 79, No. 11, pp. 2975–2976, (1957).

Breslow, D.S., et al., "Bis–(Cyclopentadienyl)– Titanium Dichloride– Alkylaluminum Complexes as Catalysts for the Polymerization of Ethylene", Journal of the American Chemical Society, vol. 79, No. 18, pp. 5072–5073, (1957).

Chien, J.C.W., et al., "Olefin Copolymerization with Metallocene Catalysts. III Supported Metallocene/Methylaluminoxane Catalyst for Olefin Colpolmerization", Journal of Polymer Science, Part A, Polymer Chemistry, vol. 29, pp. 1604–1607 (1991).

Kaminaka, M., et al., "Polymerization of Propene with Catalyst Systems Composed of $AL_2O_3$–OR $MGCL_2$– Supported $ET[INDH_4]_2ZRCL_2$ and $ALR_3(R=CH_3,C_2H_5)$", Makromol. Chem., Rapid Commun. 12, 367–372 (1991).

Marks, T.J., "Surface–Bound Metal Hydrocarbyls. Organometallic Connections Between Heterogeneous and Homogeneous Catalysis", Accounts of Chemical Research, vol. 25, No. 2, pp. 57–65 (1992).

Collins, S., et al., "Polymerization of Propylene Using Supported, Chiral Ansa–Mattallocene Catalysts: Production of Polypropylene with Narrow Molecular Weight Distributions", Macromolecules, vol. 25, pp. 1780–1785 (1992).

(List continued on next page.)

Primary Examiner—David W. Wu
Assistant Examiner—R. Rabago
(74) Attorney, Agent, or Firm—Kilpatrick Stockton LLP

(57) ABSTRACT

A polymerization catalyst is disclosed, wherein the catalyst comprises:
  (a) a metallocene of Ti, Zr or Hf,
  (b) an organoaluminum compound, and
  (c) a treated solid oxide support which comprises fluorine and chromium.

35 Claims, No Drawings

OTHER PUBLICATIONS

Kaminsky, W., et al., "High Melting Polypropenes by Silica–Supported Zirconocene Catalysts", Makromal. Chem., Rapid Commun., 14, 239–243 (1993).

Sorga, K., et al., "Polymerization of Propene with Zirconocene–Containing Supported Catalysts Activated by Common Trialkylaluminiums", Makromol. Chem., 1994, 1745–1755 (1993).

Soga, K., et al., "Highly Isospecific $SIO_2$–Supported Zirconocene Catalyst Activated by Ordinary Alkylaluminiums", Makromol. Chem., Rapid Commun., 15, 139–143 (1994).

Sacchi, M.C., et al., "Silica–Supported Metallocenes: Stereochemical Comparison Between Homogeneous and Heterogeneous Catalysis", Makromol. Chem., Rapid Commun., 16, 581–590 (1995).

Soga, K. et al., "Activation of $SIO_2$-Supported Zirconocene Catalysts by Common Trialkylaluminiums", Makromol. Chem., Macromolecular Chemistry and Physics, vol. 194, No. 12, pp. 3499–3504 (1993).

Soga, K. et al., "Polymerization of Propene with the Heterogeneous Catalyst system $Et[IndH_4]_2ZrCL_2/MAO/SiO_2$ Combined with Trialkylaluminium", Makromol. Chem., Rapid Commun., 13, 221–224 (1992).

* cited by examiner

ORGANOMETAL CATALYST COMPOSITIONS

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1960. However, their low productivity did not allow them to be commercialized. About 1975, it was discovered that contacting one part water with one part trimethylaluminum to form methyl aluminoxane, and then contacting such methyl aluminoxane with a melallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modem commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein ($X^1$) is independently selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of ($X^1$) are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on ($X^1$) can be a bridging group which connects ($X^1$) and ($X^2$);

wherein ($X^3$) and ($X^4$) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on ($X^2$) can be a bridging group which connects ($X^1$) and ($X^2$);

wherein the organoaluminum compound has the following general formula:

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein "n" is a number from 1 to 3 inclusive;

wherein the treated solid oxide compound comprises fluorine, chromium, and a solid oxide compound.

In accordance with another embodiment of this invention, a process is provided comprising contacting at least one monomer and the catalyst composition under polymerization condition to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

bis(cyclopentadienyl)zirconium dichloride;

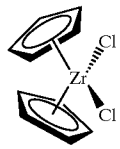

1,2-ethanediylbis($\eta^5$-1-indenyl)di-n-butoxyhafnium;

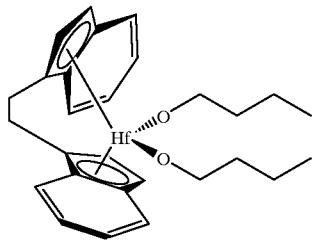

1,2-ethanediylbis(η⁵-1-indenyl)dimethylzirconium;

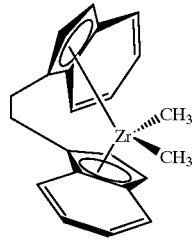

3,3-pentanediylbis(η⁵-4,5,6,7-tetrahydro-1-indenyl) hafnium dichloride;

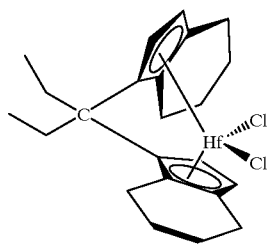

methylphenylsilylbis(η⁵-4, 5,6, 7-tetrahydro-1-indenyl) zirconium dichloride;

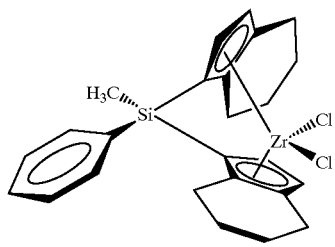

"bis(n-butylcyclopentadienyl)di-t-butylamidohafnium"

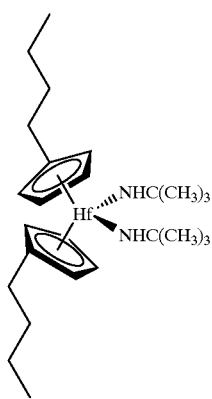

bis(n-butylcyclopentadienyl)zirconium dichloride;

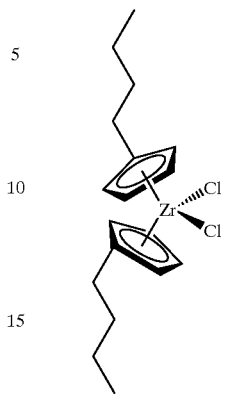

dimethylsilylbis(1-indenyl)zirconium dichloride;

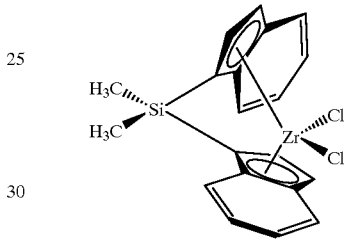

"nonyl(phenyl)silylbis(1-indenyl)hafnium dichloride"

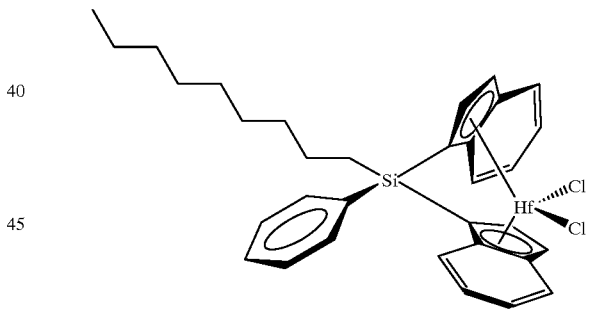

dimethylsilylbis(η⁵-4,5,6,7-tetrahydro-1-indenyl) zirconium dichloride;

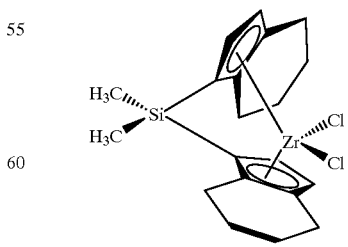

dimethylsilylbis(2-methyl-1-indenyl)zirconium dichloride;

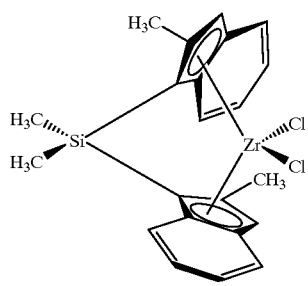

1,2-ethanediylbis(9-fluorenyl)zirconium dichloride;

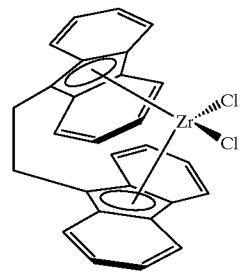

indenyl diethoxy titanium(IV) chloride;

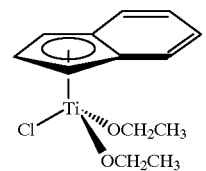

(isopropylamidodimethylsilyl)cyclopentadienyltitanium dichloride;

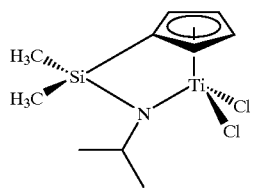

bis(pentamethylcyclopentadienyl)zirconium dichloride;

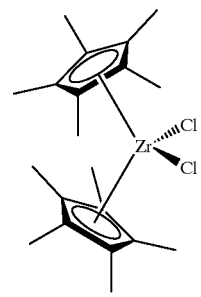

bis(indenyl) zirconium dichloride;

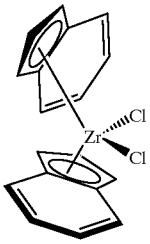

methyloctylsilyl bis (9-fluorenyl) zirconium dichloride;

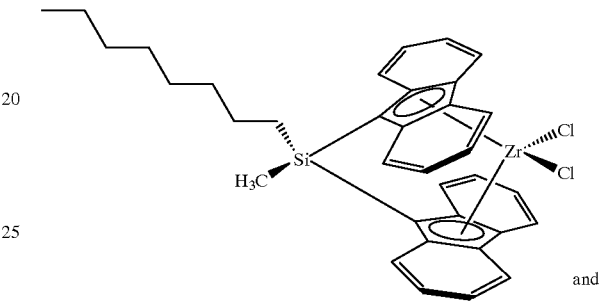

and bis-[1-(N,N-diisopropylamino)boratabenzene] hydridozirconium trifluoromethylsulfonate

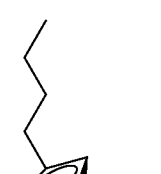

Preferably, the organometal compound is selected from the group consisting of bis(n-butylcyclopentadienyl)zirconium dichloride;

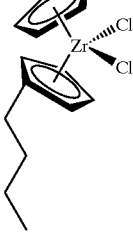

bis(indenyl)zirconium dichloride;

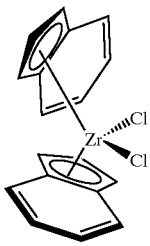

dimethylsilylbis(1-indenyl) zirconium dichloride;

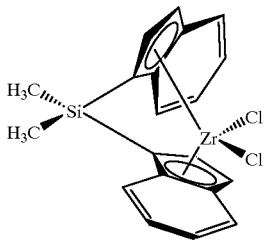

methyloctylsilylbis(9-fluorenyl)zirconium dichloride

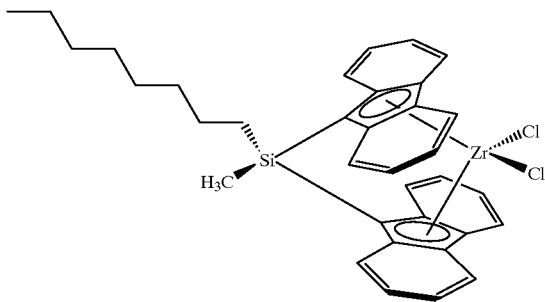

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:

trimethylaluminum;

triethylaluminum (TEA);

tripropylaluminum;

diethylaluminum ethoxide;

tributylaluminum;

diisobutylaluminum hydride;

triisobutylaluminum hydride;

triisobutylaluminum; and diethylaluminum chloride.

Currently, TEA is preferred.

The treated solid oxide compound comprises fluorine, chromium, and a solid oxide compound. The solid oxide compound can be any oxide compound known in the art capable of being impregnated with chromium and fluorine. Exemplary solid oxide compounds, include, but are not limited to, inorganic oxides, either alone or in combination, phosphated inorganic oxides, and mixtures thereof Preferably, the solid oxide compound is selected from the group consisting of alumina, silica-titania, aluminophosphate, silica-alumina, and mixtures thereof.

When a silica-titania is used, the content of titania can be about 1 to about 15% by weight titanium based on the total weight of the silica-titania, preferably, about 2.5 to about 12% by weight, and most preferably, 4 to 10% by weight, with the remainder being primarily silica. The silica-titania can be produced by any method known in the art. Such processes are disclosed in U.S. Pat. Nos. 3,887,494; 3,119,569; 4,405,501; 4,436,882; 4,436,883; 4,392,990; 4,081,407; 4,152,503; 4,981,831; 2,825,721; 3,225,023; 3,226,205; 3,622,521; and 3,625,864; the entire disclosures of which are hereby incorporated by reference. The silica-titania can be made by cogellation of aqueous materials, or by cogellation in an organic or anhydrous solution, or by coating the surface of silica with a layer of titania such as, for example, by reaction of silanol groups with titanium isopropoxide followed by calcining.

Aluminophosphate can be made by any method known in the art, such as, for example, those methods disclosed in U.S. Pat. Nos. 4,364,842, 4,444,965; 4,364,855; 4,504,638; 4,364,854; 4,444,964; 4,444,962; 4,444,966; and 4,397,765; the entire disclosures of which are hereby incorporated by reference.

Silica-alumina can be made by any method known in the art. The amount of alumina in the silica-alumina can range from about 2 to about 50% by weight based on the total weight of the silica-alumina, preferably, from about 5 to about 30% by weight, and most preferably, 8 to 20% by weight. Commercial grade silica-alumina is available as MS 13–110 from W. R. Grace and commercial grade alumina as Ketjen Grade B from Akzo Nobel.

The solid oxide compound should have a pore volume greater than about 0.5 cc/g, preferably greater than about 0.8 cc/g, and most preferably, greater than 1.0 cc/g.

The solid oxide compound should have a surface area in a range of about 100 to about 1000 m$^2$/g, preferably from about 200 to about 800 m$^2$/g, and most preferably, from 250 to 600 m$^2$/g.

To prepare the treated solid oxide compound, the solid oxide compound must be impregnated with a chromium-containing compound to produce a chromium-containing solid oxide compound. The chromium-containing compound can be incorporated during manufacturing of the solid oxide compound, such as, for example, during a gellation or spray drying process. For example, in a first method, chromium can be added to the solid oxide compound by cogellation of aqueous materials, as represented in U.S. Pat. Nos. 3,887,494; 3,119,569; 4,405,501; 4,436,882; 4,436,883; 4,392,990; 4,081,407; 4,981,831; and 4,152,503; the entire disclosures of which were previously incorporated by reference. In a second method, the chromium can be added to the solid oxide compound by cogellation in an organic or anhydrous solution as represented by U.S. Pat. Nos. 4,301,034; 4,547,557; and 4,339,559; the entire disclosures of which are hereby incorporated by reference.

Alternatively, the chromium-containing compound can be applied after the solid oxide compound is produced in a post-impregnation step, in which the chromium-containing compound is dissolved in an aqueous or organic solvent and used to impregnate the solid oxide compound. Exemplary methods of impregnating the solid oxide compound with the chromium-containing compound can be found, but are not limited to, U.S. Pat. Nos. 3,976,632; 4,2248,735; 4,297,460; and 4,397,766; the entire disclosures of which are hereby incorporated by reference.

The chromium-containing compound can be any compound capable of being converted to chromium oxide during calcining. Calcining is discussed subsequently in this disclosure. Examples of chromium-containing compounds include, but are not limited to, chromium trioxide ($CrO_3$), ammonium chromate (($NH_4)_2CrO_4$), ammonium dichromate (($NH_4)_2Cr_2O_7$), chromic acetate ($Cr(C2H3O_2)_3$), chromic nitrate, ($Cr(NO_3)_3$), chromous chloride ($CrCl_2$), bis-benzene chromium(0) (($C_6H_6)_2Cr$), chromocene (($C_5H_5)_2Cr$), and mixtures thereof.

The amount of chromium present is in the range of about 0.01 to about 10% by weight, preferably, about 0.5 to about 5% by weight, and most preferably, from 0.8% to 3% by weight, where the weight percents are based on the weight of the chromium-containing solid oxide compound before calcining.

Before, during, or after contacting the solid oxide compound with the chromium-containing compound, the solid oxide compound is contacted with a fluorine-containing compound. The order of contacting the solid oxide compound with the chromium-containing compound and the fluorine-containing compound is not important to the production of the treated solid oxide compound. Any method known in the art for contacting the solid oxide compound with the fluorine-containing compound can be used in this invention. One common method is to impregnate the solid oxide compound with an aqueous solution of a fluoride-containing salt, such as, for example, ammonium fluoride ($NH_4F$), ammonium bifluoride ($NH_4HF_2$), hydrofluoric acid (HF), ammonium silicofluoride (($NH_4)_2SiF_6$), ammonium fluoroborate ($NH_4BF_4$), ammonium fluorophosphate ($NH_4PF_6$), fluoroboric acid ($HBF_4$), and mixtures thereof. Alternatively, the fluorine-containing compound can be dissolved into an organic solvent, such as an alcohol, and used to impregnate the solid oxide compound to minimize shrinkage of pores during drying. Drying can be accomplished by any method known in the art such as vacuum drying, spray drying, flash drying, and the like.

The fluorine-containing compound can also be incorporated into a gel by adding it to one of the aqueous materials before gellation. These aqueous materials were disclosed in the first and second methods for preparing the chromium-containing solid oxide compound discussed previously in this disclosure.

The fluorine-containing compound can also be added to a slurry containing a gel before drying. Formation of a gel was disclosed in the first and second methods for preparing the chromium-containing solid oxide compound discussed previously in this disclosure.

The fluorine-containing compound can also be added during calcining. In this technique, the fluorine-containing compound is vaporized into a gas stream used to fluidize the solid oxide compound so that it is fluorided from the gas stream. In addition to some of the fluorine-containing compounds described above, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound or the chromium-containing solid oxide compound at about 300 to about 600° C. in air or nitrogen. Inorganic fluorine containing vapors may also be used, such as, for example, hydrogen fluoride or even elemental fluorine gas.

The solid oxide compound or chromium-containing solid oxide compound can also be calcined at a temperature in a range of about 100 to 900° C. before being fluorided.

The amount of fluorine present is about 1 to about 50% by weight fluorine based on the weight of the solid oxide compound before calcining. Preferably, it is about 3 to about 25% by weight, and most preferably, it is 4 to 20% by weight fluorine based on the weight of the solid oxide compound before calcining.

Generally, calcining is conducted for about 1 minute to about 100 hours, preferably for about 1 hour to about 50 hours, and most preferably, from 3 hours to 20 hours. The calcining is conducted at a temperature in a range of about 200 to about 900° C., preferably, in a range of about 300 to about 700° C., and most preferably, in a range of 350 to 600° C. Calcining must be conducted in an oxidizing atmosphere, such as, for example, oxygen or air, where at least a portion of the chromium is converted into a hexavalent state. Optionally, a reducing atmosphere such as, for example, hydrogen or carbon monoxide, can be used during calcining as is known in the art. A final calcining step in carbon monoxide at about 350° C. can be used to convert the chromium to a divalent state, which produces a catalyst that can be used to produce hexene during polymerization thus allowing in-silu production of comonomer and thus the production of copolymer from an ethylene feed. This process is described in U.S. Pat. Nos. 4,735,931, 4,820,785, and 4,988,657; the entire disclosures of which are hereby incorporated by reference. The calcining can also be accomplished in a reducing atmosphere at a temperature in the range of about 250 to 700° C., preferably from 300 to 500° C. followed by calcining in an oxidizing atmosphere, which produces a catalyst that will yield a polymer with an increased melt index. This process is described in U.S. Pat. Nos. 4,151,122; 4,177,162; 4,247,421; 4,248,735; 4,297,460; 4,397,769; and 4,460,756; the entire disclosures of which are hereby incorporated by reference.

The compositions of this invention can be produced by contacting the organometal compound, the treated solid oxide compound, and the organoaluminum compound, together. This contacting can occur in a variety of ways, such as, for example, blending. Furthermore, each of these compounds can be fed into the reactor separately, or various combinations of these compounds can be contacted together before being further contacted in a reactor zone, or all three compounds can be contacted together before being introduced into the reactor zone.

Currently, one method is to first contact the organometal compound and the treated solid oxide compound together, for about 1 minute to about 24 hours, preferably, 1 minute to 1 hour, at a temperature from about 10° C. to about 100° C., preferably 15° C. to 50° C., to form a first mixture, and then contact this first mixture with an organoaluminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C. to produce the catalyst composition.

The weight ratio of the organoaluminum compound to the treated solid oxide compound in the catalyst composition ranges from about 5:1 to about 1:1000, preferably, from about 3:1 to about 1:100, and most preferably, from 1:1 to 1:50.

The weight ratio of the treated solid oxide compound to the organometal compound in the composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. Preferably, the post-contacted treated solid oxide compound is the majority, by weight, of the composition. Often times, specific components of a catalyst are not known, therefore, for this invention, the catalyst composition is described as comprising post-contacted compounds.

The weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

The weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1.

The catalyst composition of this invention has an activity greater than a catalyst composition that uses the same organometal compound, and the same organoaluminum compound, but uses silica, fluorided silica, silica-titania, alumina, or silica-alumina, as an activator for the organometal compound as shown in comparative examples 1–3, 5 and 7. The activity is measured under slurry polymerization conditions, using isobutane as the diluent, and with a polymerization temperature of about 50 to about 110° C., and an ethylene pressure of about 400 to about 800 psig. When comparing activities, the polymerization runs should occur at the same polymerization conditions. The reactor should have substantially no indication of any wall scale, coating or other forms of fouling.

However, it is preferred if the activity is greater than about 500 grams of polymer per gram of treated solid oxide compound per hour, more preferably greater than about 1000, and most preferably greater than 2000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or borate compounds. Additionally, no organochromium compounds or $MgCl_2$ need to be added to form the invention. Although aluminoxane, borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce at least one polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-I-pentene, 4-methyl-1-pentene, 1-hexene, 3-ethyl-1-hexene, 1-heptene, 1-octene, 1-nonene, 1-decene, and mixtures thereof When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting a solid oxide compound selected from the group consisting of alumina, silica-alumina, and silica-titania with an aqueous solution containing chromic acetate and ammonium bifluoride to produce a fluorided, chromium-containing solid oxide compound having from 0.8% to 3% by weight chromium per gram of fluorided, chromium-containing solid oxide compound before calcining and 4 to 20% by weight fluorine based on the weight of the fluorided, chromium-containing solid oxide compound before calcining;

(2) calcining the fluorided, chromium-containing solid oxide compound at a temperature within a range of 350 to 600° C. for 3 to 20 hours to produce a calcined composition;

(3) combining the calcined composition and bis(n-butylcyclopentadienyl) zirconium dichloride at a temperature within the range of 15° C. to 50° C. to produce a mixture; and (4) after between 1 minute and 1 hour, combining the mixture and triethylaluminum to produce the catalyst composition.

Hydrogen can be used with this invention in a polymerization process to control polymer molecular weight.

The main feature of this invention is that the treated solid oxide compound is an active catalyst, and it also activates the organometal compound. Thus, the polymer produced can be considered a dual component or bimodal polymer. The treated solid oxide compound provides a high molecular weight component onto an otherwise symmetrical molecular weight distribution of the polymer produced by the organometal compound. This high molecular weight component, or skewed molecular weight distribution, imparts higher melt strength and shear response to the polymer than could be obtained from typical organometal compounds. One special feature of this invention, therefore, is that polydispersities of about 2.5 to about 4.0 and HLMI/MI values from about 25 to about 50 can be produced from organometal compounds that would otherwise give polydispersities of about 2.1 to about 2.5 and HLMI/MI values less than about 20.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with organometal compounds.

EXAMPLES

Standard Tests and Procedures:

A "Quantachrome Autosorb-6 Nitrogen Pore Size Distribution Instrument" was used to determined surface area and pore volume. This instrument was acquired from the Quantachrome Corporation, Syosset, N.Y.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

High load melt index (HLMI, g/10 mins) was determined in accordance with ASTM D1238 at 190° C. with a 21,600 gram weight.

Melt index (MI, g/10 mins) was determined in accordance with ASTM D1238 at 190° C. with a 2,160 gram weight.

Description of Polymerizations Runs:

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, first, a small amount (0.01 to 0.10 grams normally) of an oxide compound or the inventive treated solid oxide compound was charged under nitrogen to the dry reactor. Next, two milliliters of an organometal compound solution containing 0.5 grams of organometal metal compound (usually bis(n-butlycyclopentadienyl) zirconium dichloride) per 100 milliliters of toluene were added by syringe. Then, 1.2 liters of isobutane liquid were charged, and the reactor heated up to 90° C. One milliliter of organoaluminum compound (1 molar triethylaluminum in heptane) was added midway during the isobutane addition. Finally, ethylene was added to the reactor to equal a fixed pressure, normally 550 psig, which was maintained during the experiment. The stirring was allowed to continue for a specified time, usually about one hour, and the activity was noted by recording the flow of ethylene into the reactor to maintain pressure.

After the allotted time, the ethylene flow was stopped, and the reactor slowly depressurized and opened to recover a granular polymer. In all cases, the reactor was clean with no indication of any wall scale, coating or other forms of fouling. The polymer was then removed and weighed.

Examples Without Chromium

These examples were performed to determine suitability of a particular oxide compound for use as a component in the catalyst composition of this invention.

Example 1 Control (Silica)

This experiment shows that silica, which is commonly used in chromium oxide catalysts, does not serve as an activator for an organometal compound when used with an organoaluminum compound.

A grade 952 silica was obtained from W. R. Grace having a pore volume of about 1.6 cc/g and a surface area of about 300 $m^2$/g. About 10 grams of the silica were placed in a 1.75 inch quartz tube fitted with a sintered quartz disk at the bottom. While the silica was supported on the disk, dry air was blown up through the disk at the linear rate of about 1.6 to about 1.8 standard cubic feet per hour. An electric furnace around the quartz tube was then turned on, and the temperature was raised at the rate of about 400° C. per hour to a temperature of about 600° C. At this temperature, the silica was allowed to fluidize for three hours in the dry air. Afterward, it was collected and stored under dry nitrogen having no exposure to the atmosphere.

The silica was then added to the reactor, followed by an organometal solution and a triethylaluminum (TEA) solution as described previously. These runs are shown in Table 1. The silica produced almost no polymer.

Example 2 Control (Fluorided Silica)

Similarly to Example 1, this example shows that contacting the silica with a fluorine-containing compound still does not make it suffice as an activator for an organometal compound, and this excludes it from use in the catalyst composition of this invention.

A 50 gram sample of the grade 952 silica described previously was impregnated with 100 milliliters of an aqueous solution containing 5 grams of dissolved ammonium bifluoride to produce a fluorided silica. This gave the sample a wet sand consistency which was then dried under half an atmosphere of vacuum at 110° C. overnight. Then, the fluorided silica was calcined in dry air at 600° C. by the procedures described previously. This gave a fluorided silica having a surface area of about 192 $m^2$/g and a pore volume of about 1.29 cc/g.

A small sample of the fluorided silica was then tested for polymerization activity with an organometal compound. As shown in Table 1, it provided no activity.

Example 3 Control (Silica-Titania)

A silica-titania was prepared by cogellation as described in Deitz (U.S. Pat. No. 3,887,494). Titanyl sulfate was dissolved in concentrated sulfuric acid, to which a sodium silicate solution was added slowly with vigorous stirring.

When the pH reached about 6, the mixture gelled into a homogenous clear mass. This was then aged at 80° C. at pH 7 for three hours, then washed nine times with water and two times in 1% by weight ammonium nitrate. This gel was then azeotropically dried in ethyl acetate to produce a silica-titania. The silica-titania contained 8% titanium and had a surface area of about 450 m$^2$/g and a pore volume of about 2.0 cc/g. A 10 gram sample was then calcined at 600° C. for three hours in fluidizing dry air. Afterward, a small sample of the silica-titania was tested for polymerization activity with an organometal compound solution. As shown in Table 1, it exhibited no appreciable activity.

Example 4 Invention Component Control (Fluorided Silica-Titania)

The following example demonstrates that fluorided silica-titania is an efficient activator for organometal compounds and is thus useful as a component in the inventive catalyst composition.

A sample of 8.51 grams of the silica-titania from Example 5 was calcined by fluidizing in dry air at 600° C. for three hours to produce a calcined silica-titania. Then, the calcined silica-titania was impregnated with 35 milliliters of a solution made by dissolving 2.50 grams of ammonium bifluoride in 100 milliliters of methanol. This brought the calcined silica-titania to incipient wetness and constituted the equivalent of about 3.9 millimoles fluorine per gram of calcined silica-titania to produce a fluorided silica-titania. The methanol was then evaporated off, and the fluorided silica-titania was again calcined in air at 600° C. for three hours as described previously.

0.1166 grams of the fluorided silica-titania were first charged under nitrogen to the dry reactor. Next, two milliliters of an organometal compound solution were added by syringe containing 0.5 grams of bis(n-butlycyclopentadienyl) zirconium dichloride per 100 milliliters of toluene. Then, 1.2 liters of isobutane liquid were charged, and the reactor brought up to 90° C. One milliliter of 15% by weight triethylaluminum was added midway during the isobutane addition. Finally, ethylene was added to the reactor to equal 550 psig pressure which was maintained during the experiment. The stirring was allowed to continue for one hour, and the activity was noted by recording the flow of ethylene into the reactor to maintain pressure.

After the allotted time, the ethylene flow was stopped, and the reactor slowly depressurized and opened to recover a granular polymer. The reactor was clean with no indication of any wall scale, coating or other forms of fouling. As shown in Table 1, the polymer was removed and weighed, yielding 137.5 grams. Thus, the activity was found to be 1164 grams of polymer produced per gram of fluorided silica-titania charged per hour.

The polymer had a melt index of 0.04 g/10 min and a high load melt index of 1.72 g/10 min giving a shear ratio of 42.5, which is higher than the usual 16 to 17 ratio obtained for metallocenes. The number average molecular weight was found to be 66,000, and the weight average molecular weight was 178,000, giving a polydispersity Mw/Mn of 2.7.

Example 5 Control: (Alumina)

Alumina samples were also activated by the procedure described previously. A commercial alumina sold as Ketjen grade B alumina was obtained, having a pore volume of about 1.78 cc/g and a surface area of about 340 m$^2$/g. The samples were calcined by the procedure discussed previously at 600° C. to produce a calcined alumina. A sample of the calcined alumina was then tested with an organometal compound and triethylaluminum for polymerization activity. Alumina, which is regarded as more acidic than silica, produced a little more polymer, but still the activity was very low. Thus, the calcined alumina as shown here would not be suitable for use in the catalyst composition of this invention.

Example 6 Invention Component Control: (Fluorided Alumina)

A 10 gram sample of Ketjen B alumina, which had been previously calcined at 600° C., was impregnated with 20 milliliters of an aqueous solution containing 1.0 gram of ammonium bifluoride to produce a fluorided alumina. The sample was then dried under vacuum overnight and again calcined under flowing dry nitrogen at 600° C. for three hours. The fluorided alumina was then tested for polymerization activity with an organometal compound solution. It yielded an activity of 1250 grams of polymer per gram of fluorided alumina per hour. This example shows that fluorided alumina is an efficient activator for organometal compounds and is thus useful as a component in the inventive catalyst composition.

Example 7 Control: (Silica-Alumina)

Silica-alumina was obtained from W. R. Grace as MS 13–110 containing 13% by weight alumina and 87% by weight silica. The silica-alumina had a pore volume of about 1.2 cc/g and a surface area of about 350 m$^2$/g. A sample of the silica-alumina was calcined as described previously in dry air at 600° C. for three hours. It was then tested for polymerization activity in combination with an organometal compound and triethylaluminum. As can be seen in Table 1, the activity was poor, making silica-alumina unsuitable for use in the catalyst composition of this invention.

Example 8 Invention Component Control: (Fluorided Silica-Alumina)

Fifty grams of the silica-alumina discussed previously, sold as MS 13–110 by W. R. Grace Company, was impregnated with 100 milliliters of an aqueous solution containing 5 grams of ammonium bifluoride for a 10% by weight loading to produce a fluorided silica-alumina. This resulted in a wet sand consistency. The fluorided silica-alumina was then placed in a vacuum oven and dried overnight at 110° C. under half an atmosphere of vacuum. Then, 10 grams of the fluorided silica-alumina was calcined in dry fluidizing air at a required temperature for three hours. The fluorided silica-alumina was then stored under nitrogen until a small quantity was charged to the reactor with an organometal compound and triethylaluminum as described previously. The fluorided silica-alumina yielded 5537 grams of polymer per gram of fluorided silica-alumina per hour, making it an excellent choice for use as a component in this invention.

TABLE 1

| Example | Oxide Type | Calcining Temp. (° C.) | Oxide Charged (g) | Organo-Aluminum Compound (ml) | Polymer (g) | Run Time (min) | Activity (g/g/h) |
|---|---|---|---|---|---|---|---|
| 1-Control | Silica | 600 | 0.5686 | 2 | 0.65 | 63.0 | 1 |
| 2-Control | Fluorided Silica | 600 | 0.4350 | 1 | 0 | 24.5 | 0 |
| 3-Control | Silica-Titania | 600 | 0.1392 | 2 | 0 | 60 | 0 |
| 4-Component | Fluorided Silica-Titania | 600 | 01166 | 1 | 135.7 | 60.0 | 1164 |
| 5-Control | Alumina | 600 | 0.2361 | 2 | 6.9 | 60.9 | 29 |
| 6-Component | Fluorided Alumina | 600 | 0.2253 | 2 | 281.6 | 60.0 | 1250 |
| 7-Control | Silica-Alumina | 600 | 0.3912 | 1 | 8.3 | 40.0 | 32 |
| 8-Component | Fluorided Silica-Alumina | 600 | 0.0897 | 1 | 149 | 18.0 | 5537 |

Polymerization at 90° C., 550 psig, 1.2 liters of isobutane;
Organometal Compound = 25 micromoles bis(n = butyl cyclopentadienyl) zirconium dichloride, or 2.3 mg Zr,
Organoaluminum Compound = 1 or 2 ml of 1 molar triethylaluminum (TEA)

Example 9: (Inventive)

This example shows the use of fluorided silica-titania as an activator for two catalysts, a chromium oxide and an organometal compound, bis(n-butylcyclopentadienyl) zirconium dichloride. The amount of organoaluminum compound is kept high enough to activate the organometal compound and low enough not to poison the treated solid oxide compound. The organometal compound and treated solid oxide compound are capable of simultaneously producing what becomes a unique composite polymer.

The same silica-titania described previously in Examples 3 and 4 was impregnated with 1% by weight chromium from an alcoholic solution of chromic acetate and also 10% by weight ammonium bifluoride in methanol to produced a treated solid oxide compound. The treated solid oxide compound was then calcined in dry air at 600° C. for three hours. The treated solid oxide compound was tested with triisobutyl aluminum (TIBA) only in Example 9A, then it was retested with the organometal compound added in Example 9C. In both cases, a small amount of hydrogen was also added, specifically 46 psig from a 0.12 liter steel vessel. This was done to separate the molecular weights of the two catalysts, since organometal compounds are known to be more sensitive to hydrogen as a molecular weight regulating agent. In Example 9B, a polymerization run was conducted using a fluorided silica-titania without chromium and an organometal compound for comparison purposes.

The results are shown in Table 2. Use of the treated solid oxide compound alone in Example 9A gave a very high molecular weight polymer. When both the treated solid oxide compound and an organometal compound were present (Example 9C), a good activity was observed, and a polymer having a broader molecular weight distribution than expected from an organometal compound alone was produced but not as broad as the treated solid oxide compound. This is useful in producing film polymers possessing the preferred attributes of both a chromium oxide catalyst and a metallocene catalyst.

TABLE 2

| Example | 9A | 9B | 9C |
|---|---|---|---|
| Cr Content (wt %) | 1% Cr | None | 1% Cr |
| Organometal Compound (ml) | None | 2 | 1 |

TABLE 2-continued

| Example | 9A | 9B | 9C |
|---|---|---|---|
| Organoaluminum Compound (ml) | 10 ml (5 wt % TIBA) | 1 ml (1 Molar TEA) | 10 ml (5 wt % TIBA) |
| Hydrogen Added (psi) | 46 | 0 | 46 |
| Activity (g/g/hr) | 140 | 1164 | 1512 |
| Melt Index (g/10 min) | 0 | 0.04 | 0.22 |
| HLMI (g/10 min) | 0.12 | 1.72 | 5.3 |
| Cr Content (wt %) | 1% Cr | None | 1% Cr |
| Mw | 741,000 | 178,000 | 172,000 |
| Mn | 73,900 | 6600 | 51,400 |
| Mw/Mn | 10.0 | 2.7 | 3.3 |

Polymerization at 90° C., 550 psig, 1.2 liters of isobutane; Organometal Compound = bis(n-butyl cyclopentadienyl) zirconium dichloride; Organoaluminum Compound: TEA = triethylaluminum; TIBA = triisobutylaluminum; Activity = grams of polymer per gram of fluorided silica-titania (Example 9B) or treated solid oxide compound (Examples 9A & 9C) per hour (g/g/hr); Mw = weight average molecular weight; Mn = number average molecular weight.

Example 10: (Inventive)

Fifty grams of the silica-alumina described above, MS 13–110, was impregnated with 100 milliliters of an aqueous solution containing 7.5 grams of zinc chloride, 5 grams of ammonium bifluoride, and enough chromium nitrate to equal 1% by weight chromium on the silica-alumina. The zinc chloride was added to enhance activity. After being dried in a vacuum oven overnight at 110° C., the catalyst was calcined in dry air at 600° C. for three hours. It was then tested for polymerization activity in three runs, which are shown in Table 2.

Run 10A shows the result of polymerization without an organometal compound. The polymer produced by the treated solid oxide compound h ad a very high molecular weight and a broad molecular weight distribution. Run 10B shows the effect of adding a small amount of organometal compound, and Run 10C shows the addition of more organometal compound. The activity and the high load melt index both increased as the contribution of the organometal compound became larger. Finally, Run 10D shows the use of only the organometal compound for comparison.

TABLE 3

| Example | 10A | 10B | 10C | 10D |
|---|---|---|---|---|
| Cr Content (wt %) | 1 | 1 | 1 | none |
| Organometal Compound (ml) | None | 0.5 | 2 | 2 |
| Organoaluminum Compound ml | 4 ml (0.5 wt % TEA) | 4 ml (0.5 wt % TEA) | 1 ml (15 wt % TEA) | 1 ml (15 wt % TEA) |
| Treated Solid Oxide Compound (g) | 0.0984 | 0.1448 | 0.1148 | 0.0897 |
| Polymer Yield (g) | 76 | 213 | 134 | 149 |
| Run Time (min) | 75 | 80 | 10 | 18 |
| Activity (g/g/hr) | 618 | 1103 | 7003 | 5536 |
| Melt Index (g/10 min) | 0 | 0.11 | 0.22 | 0.18 |
| HLMI (g/ml 10 min) | 0.20 | 4.95 | 4.12 | 3.44 |
| HLMI/MI | | 45.8 | 19.1 | 19.0 |
| Mw | 376,000 | 177,000 | | 126,000 |
| Mn | 6700 | 29,900 | | 50,200 |
| Mw/Mn | 54,7 | 5.9 | | 2.5 |

Polymerization at 90° C., 550 psig, 1.2 liters of isobutane; Organometal Compound = 0.5 wt % bis(n-butyl cyclopentadienyl) zirconium dichloride; Organoaluminum Compound: TEA = triethylaluminum; TIBA = triisobutylaluminum; Activity = grams of polymer per gram of fluorided silica-titania (Example 10B) or treated solid oxide compound (Examples 10A & 10C) per hour (g/g/hr); Mw = weight average molecular weight; Mn = number average molecular weight.

While this invention has been described in detail for the purpose of illustration, it is not intended to be limited thereby but is intended to cover all changes and modifications within the spirit and scope thereof.

That which is claimed is:

1. A process to produce a catalyst composition, said process comprising contacting at least one organometal compound, and at least one organoaluminum compound, and at least one treated solid oxide compound to produce said catalyst composition, wherein said organometal compound has the following general formula:

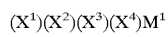

$(X^1)(X^2)(X^3)(X^4)M^1$ wherein
$M^1$ is selected from the group consisting of titanium, zirconium, and hafnium;
wherein ($X^1$) is independently selected from the group consisting of cyclopentadienyls, indenyls, fluorenyls, substituted cyclopentadienyls, substituted indenyls, and substituted fluorenyls;
wherein substituents on said substituted cyclopentadienyls, substituted indenyls, and substituted fluorenyls of ($X^1$) are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, and germanium;
wherein at least one substituent on ($X^1$) can be a bridging group which connects ($X^1$) and ($X^2$);
wherein ($X^3$) and ($X^4$) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;
wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;
wherein substituents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, and germanium;
wherein at least one substituent on ($X^2$) can be a bridging group which connects ($X^1$) and ($X^2$);

wherein said organoaluminum compound has the general formula:

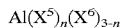

wherein
($X^5$) is a hydrocarbyl having from 1 to about 20 carbon atoms;
wherein ($X^6$) is a halide, hydride, or alkoxide; and
wherein "n" is a number from 1 to 3 inclusive; and
wherein said treated solid oxide compound comprises fluorine chromium, and at least one solid oxide compound;
wherein there is a substantial absence of borates and aluminoxanes.

2. A process to produce a catalyst composition comprising:
1) contacting a solid oxide compound selected from the group consisting of alumina, silica-alumina, and silica-titania with an aqueous solution containing chromic acetate and amtmonium bifluoride to produce fluorided, chromium-containing solid oxide compound having from 4 to 20% by weight fluorine based on the weight of the fluorided, chromium-containing solid oxide compound before calcining, and having 0.8 to 3% by weight chromium based on the weight of the fluorided, chromium-containing solid oxide compound before calcining;
2) calcining said fluorided, chromium-containing solid oxide compound at a temperature within a range of 350 to 600° C. for 3 to 20 hours to produce a calcined composition;
3) combining said calcined composition and bis(n-butylcyclopentadienyl) zirconium dichloride at a temperature within the range of 15° C. to 50° C. to produce a mixture; and
4) after between 1 minute and 1 hour, combining the mixture and triethylaluminum to produce said catalyst composition.

3. A process according to claim 2 wherein said process consists essentially of steps (1), (2), (3), and (4).

4. A catalyst composition produced by the process of claim 1.

5. A catalyst composition according to claim 4 wherein said catalyst composition has an activity greater than 500 grams of polymer per gram of treated solid oxide compound per hour under slurry polymerization conditions, using isobutane as a diluent, with a polymerization temperature of 90° C., and an ethylene pressure of 550 psig.

6. A catalyst composition according to claim 5 wherein said catalyst composition has an activity greater than 2000 grams of polymer per gram of treated solid oxide compound per hour under slurry polymerization conditions, using isobutane as a diluent, with a polymerization temperature of 90° C., and an ethylene pressure of 550 psig.

7. A catalyst composition according to claim 5 wherein a weight ratio of said organoaluminum compound to said treated solid oxide compound in said catalyst composition ranges from about 3:1 to about 1:100.

8. A catalyst composition according to claim 7 wherein said weight ratio of said organoaluminum compound to said treated solid oxide compound in sad catalyst composition ranges from 1:1 to 1:50.

9. A catalyst composition according to claim 5 wherein a weight ratio of said treated solid oxide compound to said organometal compound in said catalyst composition ranges from about 1000:1 to about 10:1.

10. A catalyst composition according to claim 9 wherein said weight ratio of said treated solid oxide compound to said organometal compound in said catalyst composition ranges from 250:1 to 20:1.

11. A catalyst composition according to claim 10 wherein said treated solid oxide compound comprises a silica-titania, from 4 to 20% by weight fluorine based on the weight of said treated solid oxide compound before calcining, 0.8% to 3% by weight chromium based on the weight of said treated solid oxide compound before calcining, and is calcined for 3 to 20 hours at a temperature from 350 to 600° C.

12. A polymerization process comprising contacting at least one monomer and said catalyst composition of claim 4 under polymerization conditions to produce a polymer.

13. A process according to claim 12 wherein said polymerization conditions comprise slurry polymerization conditions.

14. A process according to claim 13 wherein said contacting is conducted in a loop reaction zone.

15. A process according to claim 14 wherein said contacting is conducted in the presence of a diluent that comprises, in major part, isobutane.

16. A process according to claim 12 wherein at least one monomer is ethylene.

17. A process according to claim 12 wherein at least one monomer comprises ethylene and an aliphatic 1-olefin having 3 to 20 carbon atoms per molecule.

18. A process according to claim 1 wherein said treated solid oxide compound is calcined at a temperature in a range of about 300° C. to about 700° C. and a time in a range of about 1 hour to about 50 hours in an oxidizing atmosphere where at least a portion of said chromium is converted to a hexavalent state.

19. A process according to claim 18 wherein said treated solid oxide compound is calcined at a temperature in a range of 350° C. to 600° C. and a time in a range of 3 hours to 20 hours in an oxidizing atmosphere where at least a portion of said chromium is converted to a hexavalent state.

20. A process according to claim 19 wherein said treated solid oxide compound is further calcined in a reducing atmosphere.

21. A process according to claim 20 wherein said treated solid oxide compound is calcined in a carbon monoxide atmosphere at about 350° C. to convert a portion of said chromium to a divalent state.

22. A process according to claim 1 wherein said organometal compound, said treated solid oxide compound, and said organoaluminum are combined by 1) contacting said organometal compound and said treated solid oxide compound for about 1 minute to about 24 hours at a temperature from about 10° C. to about 100° C. to form a first mixture; and 2) contacting said first mixture with said organoaluminum compound to form said catalyst composition.

23. A process according to claim 22 wherein said organometal compound, said treated solid oxide compound, and said organoaluminum are combined by 1) contacting said organometal compound and said treated solid oxide compound for 1 minute to 1 hour at a temperature from 15° C. to 50° C. to form a first mixture; and 2) contacting said first mixture with said organoaluminum compound to produce said catalyst composition.

24. A process according to claim 1 wherein said organometal compound, said organoaluminum compound, and said treated solid oxide compound are precontacted for 1 minute to 1 hour at a temperature in a range of 20° C. to 80° C. to produce said catalyst composition.

25. A process according to claim 1 consisting essentially of contacting said organometal compound, said treated solid oxide compound, and said organoaluminum compound to produce said catalyst composition.

26. A process according to claim 25 wherein said treated solid oxide compound is calcined at a temperature in a range of 350° C. to 600° C. and a time in a range of 3 hours to 20 hours in an oxidizing atmosphere where at least a portion of said chromium is converted to a hexavalent state.

27. A process according to claim 26 wherein said organometal compound, said treated solid oxide compound, and said organoaluminum are combined by 1) contacting said organometal compound and said treated solid oxide compound for 1 minute to 1 hour at a temperature from 15° C. to 50° C. to form a first mixture; and 2) contacting said first mixture with said organoaluminum compound to form said catalyst composition.

28. A process according to claim 25 wherein said organometal compound, said organoaluminum compound, and said treated solid oxide compound are precontacted for 1 minute to 1 hour at a temperature in a range of 20° C. to 80° C. to produce said catalyst composition.

29. A catalyst composition according to claim 4 wherein said treated solid oxide compound is calcined at a temperature in a range of 350° C. to 600° C. and a time in a range of 3 hours to 20 hours in an oxidizing atmosphere where at least a portion of said chromium is converted to a hexavalent state.

30. A catalyst composition according to claim 4 wherein the amount of fluorine present ranges from about 3% to about 25% by weight based on the weight of said treated solid oxide compound before calcining.

31. A catalyst composition according to claim 30 wherein the amount of fluorine present ranges from 4% to 20% by weight based on the weight of said treated solid oxide compound before calcining.

32. A catalyst composition according to claim 4 wherein said organometal compound is selected from the group consisting of bis(cyclopentadienyl)hafnium dichloride, bis(cyclopentadienyl)zirconium dichloride, 1,2-ethanediylbis($\eta^5$-1-indenyl)di-n-butoxyhafnium, 1,2-ethanediylbis($\eta^5$-1-indenyl)dimethylzirconium, 3,3-pentanediylbis($\eta^5$-4,5,6,7-tetrahydro-1-indenyl)hafnium dichloride, methylphenylsilylbis($\eta^5$-4,5,6,7-tetrahydro-1-indenyl)zirconium dichloride, bis(n-butylcyclopentadienyl)di-t-butylamido hafnium, bis(n-butylcyclopentadienyl) zirconium dichloride; dimethylsilylbis(1-indenyl) zirconium dichloride, nonyl(phenyl)silylbis(1-indenyl) hafnium dichloride, dimethylsilylbis($\eta^5$-4,5,6,7-tetrahydro-1-indenyl)zirconium dichloride, dimethylsilylbis(2-methyl-1-indenyl)zirconium dichloride, 1,2-ethanediylbis(9-fluorenyl)zirconium dichloride, indenyl diethoxy titanium (IV) chloride, (isopropylamidodimethylsilyl) cyclopentadienyltitanium dichloride, bis(pentamethylcyclopentadienyl)zirconium dichloride, bis(indenyl)zirconium dichloride, methyloctylsilyl bis (9-fluorenyl) zirconium dichloride, bis-[-(N,N-diisopropylamino)boratabenzene]hydridozirconium trifluoromethylsulfonate.

33. A catalyst composition produced by the process of claim 2.

34. A catalyst composition produced by the process of claim 3.

35. A catalyst composition produced by the process of claim 25.

* * * * *